United States Patent

Dumitriu

[15] 3,641,762
[45] Feb. 15, 1972

[54] FLOATING TURBINE CONSTRUCTION

[72] Inventor: John Dumitriu, 166 Pierre Avenue, Windsor, Ontario, Canada

[22] Filed: Nov. 30, 1970

[21] Appl. No.: 93,611

[52] U.S. Cl. ................................................................60/22
[51] Int. Cl. .............................................................F03c 5/00
[58] Field of Search ....................74/1; 60/22; 417/61; 415/7

[56] References Cited

UNITED STATES PATENTS

| | | | |
|---|---|---|---|
| 2,266,272 | 12/1941 | Ruderman | 60/22 |
| 3,259,361 | 7/1966 | Cantu | 60/22 |
| 3,297,300 | 1/1967 | Mountanos | 60/22 |

Primary Examiner—Edgar W. Geoghegan
Assistant Examiner—Allen M. Ostrager
Attorney—Cullen, Settle, Sloman & Cantor

[57] ABSTRACT

A floating turbine construction which provides within a suitable framework, a plurality of linkage systems with each system flexibly connected with a series of floats partly immersed in a body of water having a current and wherein the linkage system is connected with a power transmission unit which consists of a series of sun gears, a series of planetary gears upon the sun gears interconnected with the linkage assembly and with corresponding interplanetary gears interconnecting the series of planetary gears upon the sun gear in such a manner that upward buoyant forces of the floats transmitted through the individual linkage assemblies progressively and successively cause a torque action in the gear system to thus provide torque which may be used for a useful purpose.

8 Claims, 9 Drawing Figures

INVENTOR
JOHN DUMITRIU

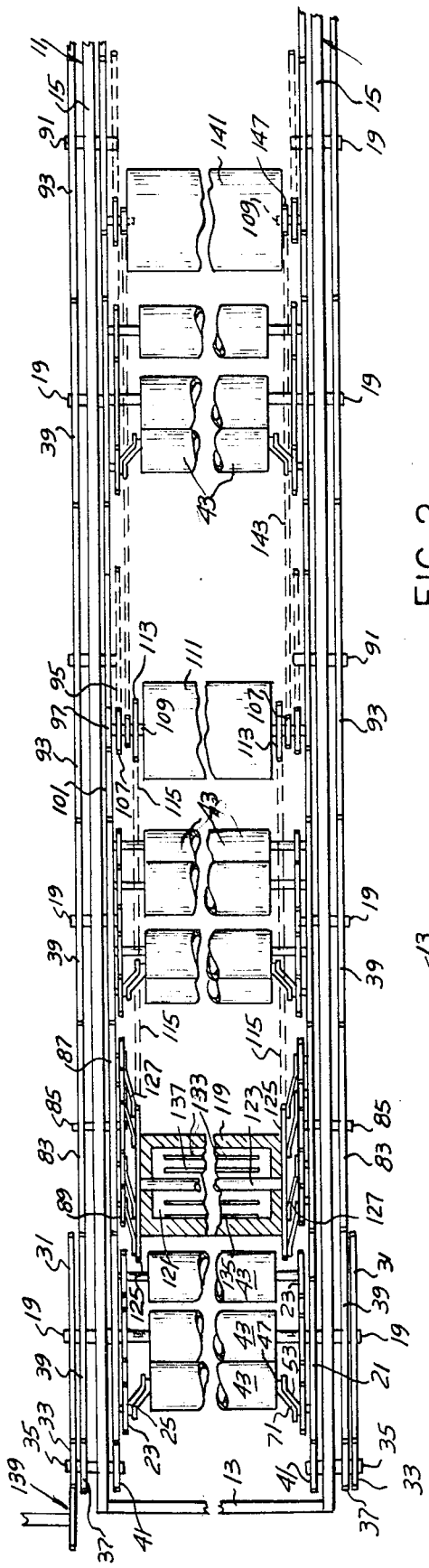
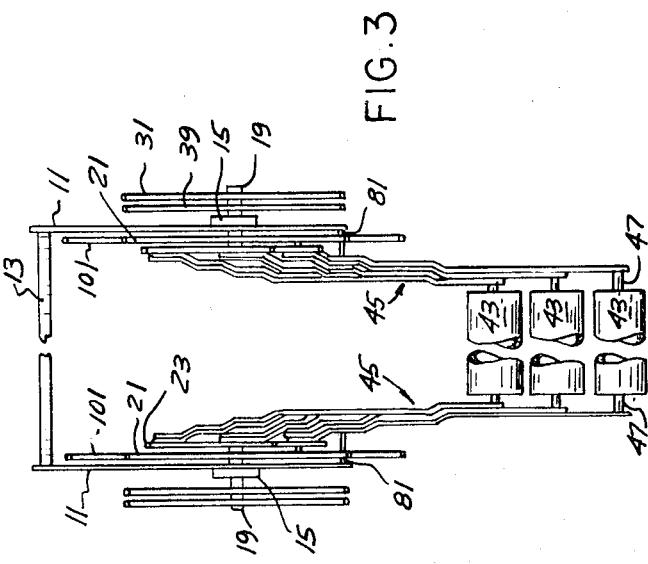

INVENTOR
JOHN DUMITRIU

INVENTOR
JOHN DUMITRIU

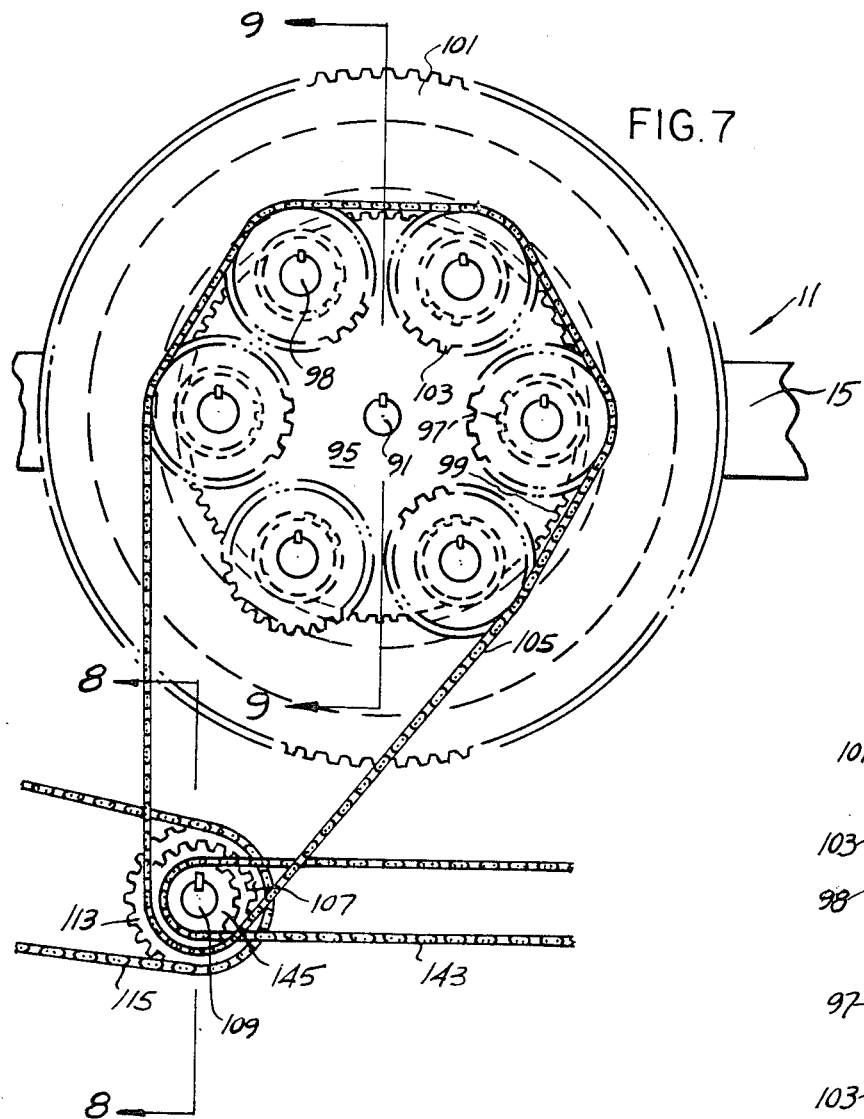
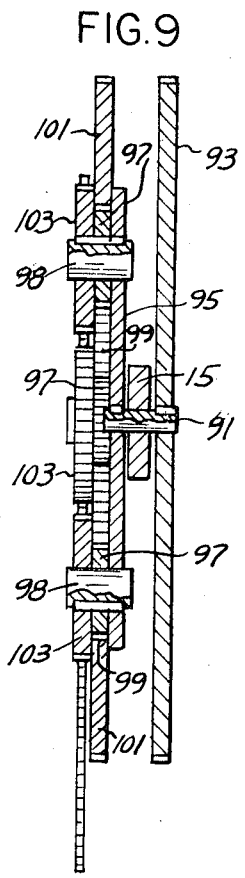
INVENTOR
JOHN DUMITRIU

FLOATING TURBINE CONSTRUCTION

BACKGROUND OF THE INVENTION

Heretofore, various types of turbines have been developed which have employed the use of moving water or different waterheads for the purpose of effecting rotation of a turbine in turn, producing power.

BRIEF DESCRIPTION OF THE INVENTION

It is an object of the present invention to provide a floating turbine construction which utilizes forces of buoyancy in a body of water or stream moving under a current wherein upward forces are utilized in connection with the linkage assembly involving leverage arms for increasing such forces and creating torque in a transmission system.

It is another object to utilize successive movements of a series of sealed tubular floats which are partly submerged within the body of water having a current stream wherein the buoyancy factor tends to effect a successive upward thrust of the said floats which thrust is transmitted through successive linkage assemblies for transmitting rotative torque to a gear transmission system and wherein, the buoyancy forces upon one side of the system are augmented by the use of leverage to thus provide increased torque for the purpose of turning and rotating the gearing arrangement; namely, the sun gears and other gears in the gear system for the primary purpose of producing torque and for providing a power takeoff.

Another object is to incorporate into the present floating turbine a series of weights, which are associated with the transmission assembly and framework so as to form a couple; namely the mass inertia downward forces of the weights, combined with the upward buoyancy forces produced by the floats.

These and other objects will be seen from the following specification in conjunction with the appended drawings in which:

FIG. 2 is a fragmentary plan view thereof;

FIG. 3 is a fragmentary end elevational view thereof;

FIG. 7 is an enlarged elevational view similar to FIG. 5 showing the takeoff drive connection between adjacent floats;

FIG. 8 is a fractional cross section through the combined takeoff and pivot shaft between adjacent float sections; and, and pivot shaft between adjacent FIG. 9 is a transverse cross section through the gear arrangement, shown in FIG. 7 as seen along link 9—9 thereof.

DETAILED DESCRIPTION

Figure 1:
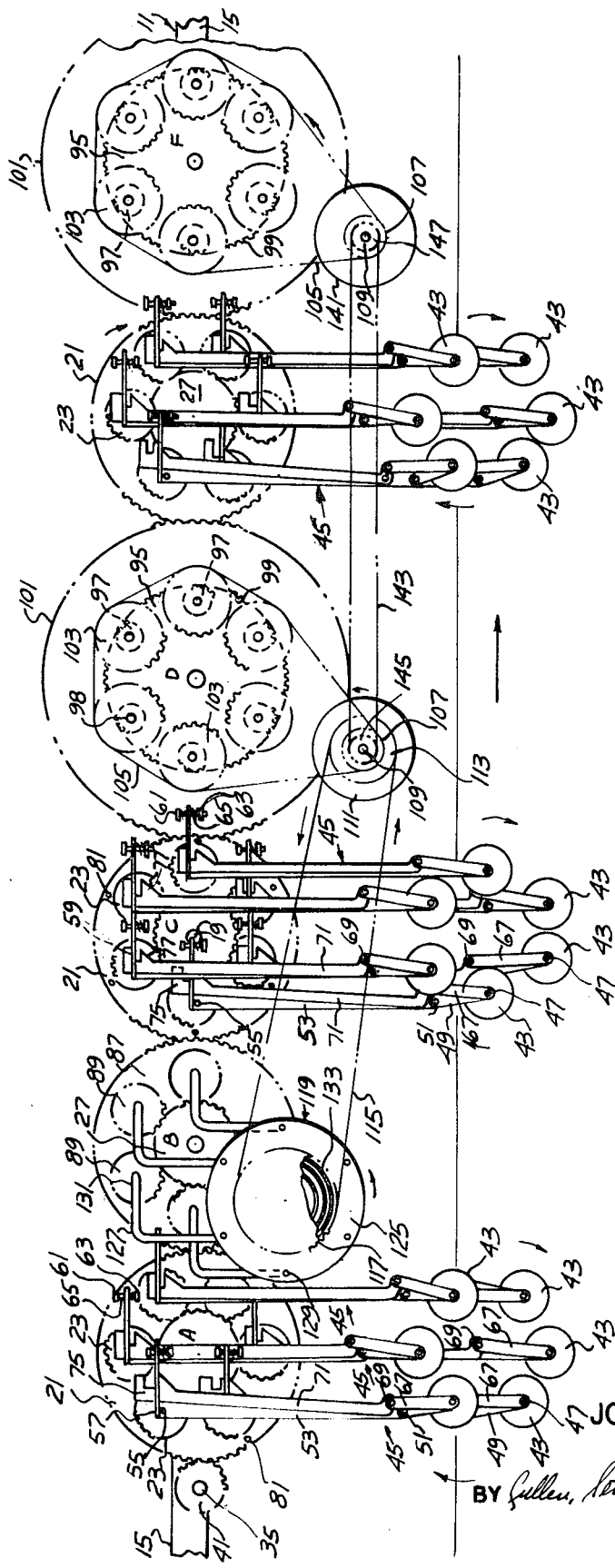
FIG. 1 is a fragmentary parly diagrammatic side elevational view of the present floating turbine.

The present drawings show one illustrative form of a floating turbine construction which will carry out the present inventive concepts and is merely for illustration.

Referring to the drawings, the present floating turbine includes a framework which includes opposed frame plates 11, transverse spacers 13 and, upon opposite sides of the frameplates, a pair of opposed elongated shaft support bars 15.

For the purpose of this disclosure, there are provided a series of buoyancy sections with associated linkages; one of which is described for illustration.

Figure 4:
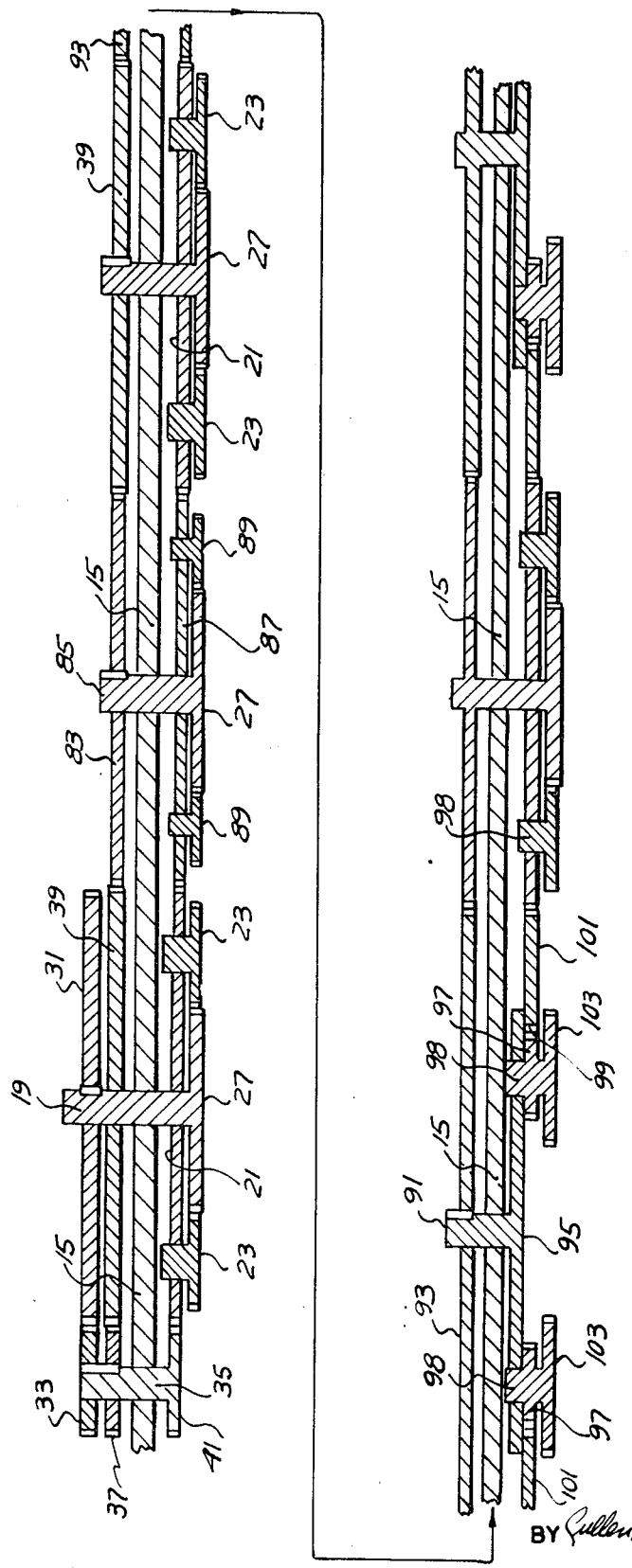
FIG. 4 is a fragmentary, cross-sectional view of a portion of the transmission assembly shown in FIG. 2.

Referring to FIGS. 2 and 4, there are, furthermore, shown in FIG. 2 a pair of parallel transmission systems; one of which is shown in detail in FIG. 4, to which a portion of the following description is directed.

Referring to FIG. 4 for each said buoyancy system, there are provided a pair of transversely arranged aligned and spaced shafts 19, which as shown in FIG. 4 are journaled through shaft support bar 15. Sun gear 21 is journaled upon shaft 19 and has mounted thereon, adjacent its periphery, a series of planetary gears 23, whose individual shafts 25 are journaled within the said sun gear and arranged in a circle.

An additional gear 31 is affixed to shaft 19 for rotation therewith and as shown in FIG. 4, is in mesh with pinion 33 which is suitably keyed to the transverse shaft 35, which is journaled through support bar 15 fragmentarily shown.

Pinion 37 secured to shaft 35 is in mesh with a transmission gear 39 which is journaled upon the transverse shaft 19.

Interplanetary gear 27 is centrally disposed with respect to planetary gears 23 and is in mesh therewith and is also affixed to or keyed to shaft 19.

Accordingly, rotation in a clockwise direction of the first-mentioned sun gear 21 causes a corresponding rotation of pinion 41, affixed to shaft 35. At the same time, a rotary movement of the planetary gears 23 causes rotation of the centrally disposed interplanetary gear 27. This torque is transmitted through shaft 19 to transmission gear 31, which in turn, through pinion 33 and shaft 35 and the additional pinion 37, transmits torque to transmission gear 39 for utilization as hereafter described with respect to FIG. 4 including the transmission gear 83.

FLOAT ASSEMBLY

Referring to FIG. 1, a series of elongated cylindrical sealed floats 43 are normally arranged spaced in a circle as shown. These floats are individually connected to corresponding planetary gears 23 by a series of independent linkage assemblies 45, generally designated as such in FIGS. 1 and 5.

At the end of each float, there is provided a longitudinally disposed pivot axis 47. Each linkage assembly includes the first pivot link 49 at one end pivotally connected at 47 to the float and at its opposite end, pivotally connected at 51 to the lower end of connecting arm 53.

The upper end of said arm is pivotally connected at 55 to a central portion of the corresponding planetary gear 23.

Figure 6:
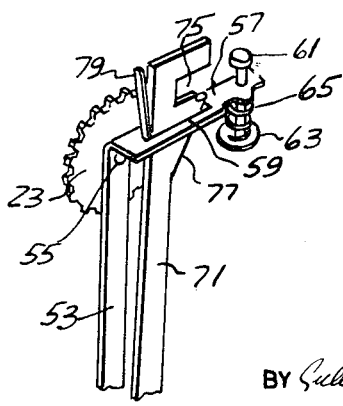
FIG. 6 is an enlarged fragmentary perspective illustration of the upper portion of an individual linkage assembly.

As best seen in detail in FIG. 6, at the upper end of the connecting arm 53 is a right angularly arranged elongated strut 57 which has formed therethrough a slot 59 and at its outer end, is apertured to receive the right angularly related plunger 61. This plunger mounts a washer 63 and associated compression spring 65, normally urging the said plunger downwardly to thus provide a yieldable connection of said plunger with the said strut for a purpose hereafter described.

The aforesaid linkage 45 also includes an additional pivot link 67 at its lower end mounted at 47 to the pivot axis of the respective floats and at its upper end at pivot point 69 connected to the lower end of the vertically reciprocal arm 71.

Again referring to FIG. 6, said arm towards it upper end extends through slot 59 of strut 57 and has a slotted upper end portion 75. This slotted portion defines therebelow a tapered stop 77 which is adapted to register with said strut at one end of the slot therein and depending upon the vertical position of the arm 71 is normally biased to the right by the elongated leaf spring 79 which is anchored on the said arm and which is adapted to bear against the opposite end of the slot forming a part of said strut.

Accordingly, depending upon the vertical positioning of the arm 71 which varies, depending upon the rotation of the sun gear, the said stop will in some positions interlock with the said strut 57, such as shown in FIG. 1, and is thus, retained in an inoperative position. See also FIG. 5.

Figure 5:
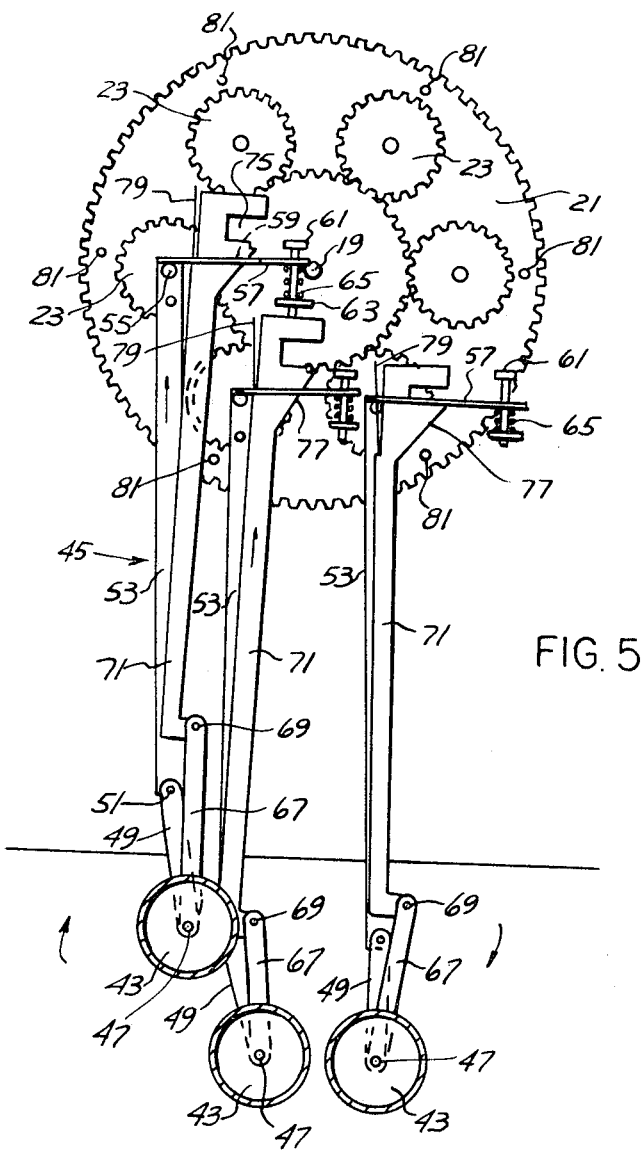
FIG. 5 is a fragmentary and schematic elevational view of a portion of a single float leverage linkage system.

In the position of the arm 71 of the intermediate float assembly shown in FIG. 5, it is noted that the upper end portion of said arm is in engagement with the yieldable plunger 61 on structure 57 of adjacent arm 53 to its left.

This is for the purpose of transmitting the buoyant force from the corresponding adjacent float through the said strut 57 which acts as a lever arm to thus provide for increased torque force applied to the adjacent pivot point 55 on the end of the corresponding strutu 57 to thus provide a multiplying factor due to the length of said leverage arm and under the formula that the total torque achieved with respect to a rotatable element is equal to the force supplied, multiplied by the length of the lever arm. This structure and function is clearly shown in FIG. 5.

The upward thrust of the arm 71 of the centrally disposed float in FIG. 5 is functioning in conjunction with the upward thrust provided through the arm 53 of the left-hand float of FIG. 5. It is these two upward thrusts which acting upon the corresponding sun gear, provide a torque therefore, causing rotation of said sun gear in a clockwise direction as indicated.

There are provided upon one side of the said sun gear 21, a series of spaced arm release pins 81, also shown in FIG. 3, so that as the sun gear rotates, the lower most vertically reciprocal arm 71 is displaced laterally against the action of its corresponding leaf spring 79, so as to become disengaged from the corresponding strut with the result that the said arm 71 is now free for upward movements such as due to the thrust of the intermediate float shown in FIGS. 3 and 5.

Referring again to FIG. 4, the torque achieved in the first described sun gear 21 through the gear relationship described is transmitted to the transmission gear 39 which is in mesh with a corresponding gear 83, FIG. 4.

This gear as shown in FIGS. 2 and 4 is secured to a transverse shaft 85 which is journaled through a portion of frame 15. The gear 87, FIG. 4, is journaled upon shaft 85 and as shown, is in mesh with the corresponding first described sun gear 21. Gear 87, FIG. 4, of which there are an opposed pair as shown in FIG. 2 also has journaled therethrough, a series of spaced circularly arranged planetary gears 89 which have in mesh therewith and centrally disposed the corresponding interplanetary gear 27.

Referring again to FIGS. 1, 2 and 4, arranged in the same plane with the corresponding sun gears 21 and the corresponding transmission gears 39 and 83, there is provided an idler gear 93. This gear is in mesh with the corresponding adjacent transmission gear 39 and is mounted upon transverse shaft 91, which is journaled through an adjacent portion of the framework as shown at 15, FIG. 4.

As seen best in FIGS. 7 to 9, idler gear 93 is connected through shaft 91 to an adjacent disc 95. This disc has mounted thereon a series of circularly arranged and spaced sprocket gears 97, whose corresponding shafts 98 are journaled through the said disc 95. These sprocket gears 97 are in supporting engagement with and in mesh with the internal gear teeth 99 of the corresponding adjacent hollow idler gear 101.

Associated with each of the respective sprocket gears 97 and outwardly thereof upon the same shaft 98 are corresponding sprocket gears 103 around which extends a sprocket chain 105, best shown in FIGS. 1 and 7.

Said sprocket chain extends around sprocket 107.

A pair of such sprocket gears are shown at 107, FIGS. 2 and 7 which terminate in axial stud shafts 109 and which mount therebetween a weight 111.

The same sprocket assembly includes an additional sprocket 113 which through a secondary sprocket chain 115, FIG. 1, receives a rotative torque from a pair of corresponding sprockets 117.

These sprockets are associated with an additional weight 119, shown in FIGS. 1 and 2. The weight 119 has an internal bore 121 and is interposed between and interconnected with the opposed pair of sprockets 117 as shown in FIG. 2.

Axially disposed through the weight 119 is an elongated shaft 114 which at its ends is secured to a pair of discs 125.

Referring to FIG. 1, the respective discs 125 are suspended from the corresponding transmission gear 87 by a series of L-shaped support arms 127 as at pivot points 129 at the lower ends of the said arms. The upper ends of said arms are connected at 131 to central portions of the corresponding planetary gears 89 which are mounted upon transmission gear 87.

Accordingly, as shown in FIG. 1, the counterclockwise rotation of gear 87 through the respective support arms 127 transmits a torque in the corresponding counterclockwise direction to the respective pair of discs 125.

Interposed within the bore of the weight 119, there is provided coiled compression spring 133 which provides the means of transmitting a torque from the pair of discs 125 through the respective pair of sprockets 117.

One end of the spring 133 is anchored at 135 to a portion of the weight and the opposite free end of the spring is anchored at 137 to a portion of the shaft 123 which interconnects the respective pair of opposed discs 125.

Accordingly, the rotative torque from the gears 87, transmitted to the corresponding discs 125 and the interconnecting shaft 123 is transmitted through the coiled spring 133 to the respective sprocket gears 117. This torque is thus transmitted through the sprocket chain 115 to the previously described sprocket assembly at 113.

This torque is, therefore, transmitted into the central portion of the idler gear arrangement 101 through the sprocket chain and sprocket gear arrangement shown at 105, FIGS. 1 and 7.

OPERATION

Referring to the drawings, the present floating turbine includes a series of buoyant set of floats as designated at FIG. 1 and these buoyancy groups are connected by their own individual linkages 45 to the corresponding adjacent sun gears. It is noted that the linkage assembly is arranged at the opposite ends of each float, and, accordingly, the pair of spaced sun gears as shown in FIG. 2 receive their torque due to the general clockwise rotation of the float assembly, due to buoyant forces of the said floats at least as to those which are immersed within and below the water level in view of the current applied thereto as designated by the arrow in FIG. 1.

Accordingly, the upward buoyant forces of the respective floats are transmitted through the linkage systems 45 and utilizing the leverage achieved by the struts 57 which form a part of the linkage assembly, create rotative torque to the corresponding sets of sun gears.

Through the transmission assembly shown in FIGS. 2 and 4, this torque moves throughout the entire line so that the corresponding sun gears and corresponding transmission gears are all interconnected into a system. Accordingly, it appears that there is no particular limit to the group of floats that may be employed in the series shown since the torque values achieved are merely added up in the entire transmission assembly due to the buoyant forces of the floats operating not only on buoyancy but also, using the leverage principle and the torque achieved through the struts which project from portions of the linkage assemblies and acting on the corresponding sun gears.

The weights 111 and 119 have a downward gravity component which may be defined as mass inertia. This mass inertia is, in effect, coupled with the buoyant forces produced by the series of float assemblies.

The exact amount of forces achieved can be determined by mathematical formula.

IN THE SYMBOLS $T=Fh$

The present system does provide a means by which, for example, referring to FIG. 2, there can be a power takeoff from the set of transmission gears, such as shown at 31–33, FIGS. 2 and 4 by which the power generator can serve a useful purpose, the takeoff being designated at 139.

Additional weight 141 FIG. 1 is suspended by sprocket chain 105 at its opposite ends the same as weight 111. Thus, torque from chains 115 is transmitted throughout sprockets 145 and chain 143 to sprockets 147 connected to weight 141. Thus, a counter torque is also transmitted to the interior of second idler gear 101.

Having described my invention, reference should now be had to the following claims.

I claim:

1. In a system which utilizes the gap between antigravity, buoyancy pressure and the gravity pressure of mass inertia, a floating turbine anchored against longitudinal movement and partly emersed in a body of moving water, comprising a framework which includes a torque transmission device having a series of interconnected torque responsive driven units;

- a plurality of longitudinally spaced circularly arranged groups of orbital floats partly emersed in the water, with one group of floats corresponding to and arranged below each driven unit;
- and a linkage assembly interposed between and connecting each float and a corresponding driven unit;
- said linkage assemblies orbiting with said floats and corresponding driven unit whereby, an adjacent one pair of said assemblies are successively interconnected and whereby, the upward torque thrust of one linkage assembly is applied eccentrically through a lever arm to the other linkage assembly.

2. In the floating turbine of claim 1, said linkage assembly including a first arm flexibly interconnecting a float and a corresponding drive means on said driven unit for exerting an antigravity torque pressure on said driven unit;

- and a second arm flexibly connected to said float and adapted to exert an antigravity torque pressure through an eccentric leverage to a first arm of an adjacent float linkage assembly;
- said second eccentrically applied torque pressure being applied by the second arm of a linkage assembly to the first arm of the next forwardly adjacent linkage assembly;
- there being on and around each driven unit a series of spaced drive means.

3. In the floating turbine of claim 2, said floats and respective linkage assemblies being so arranged that at one time, only two adjacent floats of the group are effective for providing the multiplied antigravity torque forces.

4. In the floating turbine of claim 2, each driven unit being a sun gear;

- said drive means being planetary gears journaled upon said sun gear;
- and an interplanetary gear coaxial to and journaled through said sun gear, and interconnecting all the planetary gears.

5. In the floating turbine of claim 4, there being a series of said sun gears with interconnecting idler gear means between each pair of sun gears, all sun gears rotating clockwise.

6. In the floating turbine of claim 2, each driven unit including a pair of parallel spaced sun gears, there being drive means on each sun gear;

- there being a linkage assembly at the respective ends of each float connecting said float ends to said respective drive means of said pair of sun gears.

7. In the floating turbine of claim 6, said drive means being planetary gears journaled on each sun gear;

- and an interplanetary gear coaxial and journaled through each sun gear and intermeshing with all its planetary gears respectively.

8. In the floating turbine of claim 5, each driven unit including a pair of parallel spaced sun gears, there being drive means on each sun gear;

- there being a linkage assembly at the opposite ends of each float connecting said float ends to said respective drive means of said pair of sun gears;
- one idler gear means including a pair of spaced idler sun gears;
- a series of spaced planetary gears journaled on each said sun gear;
- an interplanetary gear journaled on each said latter sun gears meshing with said planetary gears respectively;
- a pair of parallel discs and interconnected axle depending from said pair of parallel idler gears;
- means flexibly suspending said discs respectively throughout their periphery from the corresponding planetary gears of said latter sun gears respectively; for transmitting torque therethrough;
- a cylindrical weight having a bore interposed between said discs and over the connecting shaft;
- a sprocket gear loosely journaled on each disc;
- and a tension spring within said weight interconnecting said discs and said sprocket gears respectively;
- and flexible torque transmitting driven means connected to said sprocket gears for transmitting a yieldable opposing torque into the next adjacent idler gear means.

* * * * *